US012288633B2

(12) United States Patent
Moriyama et al.

(10) Patent No.: US 12,288,633 B2
(45) Date of Patent: Apr. 29, 2025

(54) MULTI-CORE CABLE

(71) Applicant: Proterial, Ltd., Tokyo (JP)

(72) Inventors: Masashi Moriyama, Tokyo (JP); Detian Huang, Tokyo (JP); Kazuhiro Aida, Tokyo (JP)

(73) Assignee: Proterial, Ltd., Tokyo (JP)

( * ) Notice: Subject to any disclaimer, the term of this patent is extended or adjusted under 35 U.S.C. 154(b) by 39 days.

(21) Appl. No.: 18/103,660

(22) Filed: Jan. 31, 2023

(65) Prior Publication Data

US 2023/0245800 A1 Aug. 3, 2023

(30) Foreign Application Priority Data

Feb. 1, 2022 (JP) ................................ 2022-014524

(51) Int. Cl.
*H01B 7/18* (2006.01)
*H01B 7/29* (2006.01)
*H01B 11/12* (2006.01)

(52) U.S. Cl.
CPC ........... *H01B 7/292* (2013.01); *H01B 7/1875* (2013.01); *H01B 11/12* (2013.01)

(58) Field of Classification Search
CPC .......... H01B 5/08; H01B 7/02; H01B 7/0208; H01B 7/18; H01B 7/1875; H01B 7/29; H01B 7/292; H01B 7/324; H01B 11/04
USPC ..................... 174/110 R–113 R, 120–122 SR
See application file for complete search history.

(56) References Cited

U.S. PATENT DOCUMENTS 1,686,782 A * 10/1928 Hans, V ................. H01B 7/428 174/121 R
3,392,017 A * 7/1968 Quaas .................. B23K 35/302 148/433
8,471,149 B2 * 6/2013 Huynh ................... H01B 7/048 174/105 R
8,937,253 B2 * 1/2015 Watanabe ....... A61M 25/09033 174/107
10,366,811 B2 * 7/2019 Kobayashi ......... H01B 11/1008
10,566,107 B2 * 2/2020 Kohori ................... H01B 3/447
11,101,054 B2 * 8/2021 Matsumura .............. H01B 7/02
11,742,112 B2 * 8/2023 Hashimoto ............ H01B 7/295 174/113 R (Continued)

FOREIGN PATENT DOCUMENTS

JP S58-86695 A 5/1983
JP 6747564 A * 8/2020 ............... H01B 7/16

*Primary Examiner* — William H. Mayo, III
(74) *Attorney, Agent, or Firm* — MCGINN I.P. LAW GROUP, PLLC

(57) ABSTRACT

A multi-core cable is provided with a heat detection line including a twisted pair wire having a pair of heat detecting wires being twisted together, a plurality of electric wires spirally twisted around the heat detection line, and a sheath covering the heat detection line and the plurality of electric wires together. Each heat detecting wire includes a first conductor and a first insulator covering around the first conductor, and a jacket covers around the twisted pair wire. Each electric wire includes a second conductor and a second insulator covering around the second conductor. The jacket includes an inner layer, an outer layer, and an intermediate layer provided between the inner layer and the outer layer, and a hardness of the outer layer is higher than a hardness of the inner layer.

20 Claims, 5 Drawing Sheets

(56) References Cited

U.S. PATENT DOCUMENTS

| | | | | |
|---|---|---|---|---|
| 2006/0054334 | A1* | 3/2006 | Vaupotic | H01B 11/1008<br>174/106 R |
| 2020/0013525 | A1* | 1/2020 | Hashimoto | H01B 7/295 |
| 2022/0044844 | A1* | 2/2022 | Moriyama | H01B 7/18 |
| 2022/0068521 | A1* | 3/2022 | Huang | H01B 7/1875 |

* cited by examiner

MULTI-CORE CABLE

CROSS-REFERENCE TO RELATED APPLICATIONS

The present application is based on Japanese patent application No. 2022-014524 filed on Feb. 1, 2022, the entire contents of which are incorporated herein by reference.

TECHNICAL FIELD

The present invention relates to a multi-core cable.

BACKGROUND OF THE INVENTION

Conventionally, fire detection wires have been used to detect fires (see e.g., Patent Literature 1). The fire detection wire is configured to have a twisted pair wire including a pair of fire detection electric wires being twisted together, each of which includes a conductor composed of a steel wire such as a piano wire and a low melting point insulator covering around the conductor, and a jacket covering the twisted pair wire.

Further, conventionally, the fire detection wire is arranged along a cable. For example, in a multi-core cable used for contactless power supplies, a fire detection wire is provided between the multi-core cable and a housing for accommodating the multi-core cable.

Citation List Patent Literature 1: JPS58-86695A

SUMMARY OF THE INVENTION

By the way, in a system used in a clean environment such as an automatic transfer system in a semiconductor factory, etc., contactless power supplies for supplying power in a non-contact manner are generally used. Power supply cables to be used for such contactless power supplies receive a large current flow. Therefore, there is a demand to suppress the rise in temperature in the cable, which may result in a fire when excessive current flows through the cable for any reason.

In addition, since the power supply cable described above is laid, for example, inside the housing, there is a limit to the outer diameter of the cable. Therefore, there is a demand to reduce AC (alternating current) resistance to high-frequency (for example, 5 kHz or higher) AC used for power supply without increasing the outer diameter of the cable.

Therefore, the object of the present invention is to provide a multi-core cable capable of accurately detecting temperature rise in the multi-core cable and reducing AC resistance.

For the purpose of solving the aforementioned problem, one aspect of the present invention provides a multi-core cable, comprising:

- a heat detection line comprising a twisted pair wire comprising a pair of heat detecting wires being twisted together, each heat detecting wire comprising a first conductor and a first insulator covering around the first conductor, and a jacket covering around the twisted pair wire;
- a plurality of electric wires spirally twisted around the heat detection line, each electric wire comprising a second conductor and a second insulator covering around the second conductor; and
- a sheath covering the heat detection line and the plurality of electric wires together, wherein the jacket comprises an inner layer, an outer layer, and an intermediate layer provided between the inner layer and the outer layer, and
- wherein a hardness of the outer layer is higher than a hardness of the inner layer.

Advantageous Effects of the Invention

According to the present invention, it is possible to provide a multi-core cable capable of accurately detecting temperature rise in the multi-core cable and reducing AC resistance.

DETAILED DESCRIPTION OF THE INVENTION (Embodiment) Next, an embodiment of the present invention will be described below in conjunction with the accompanying drawings.

Figure 1:
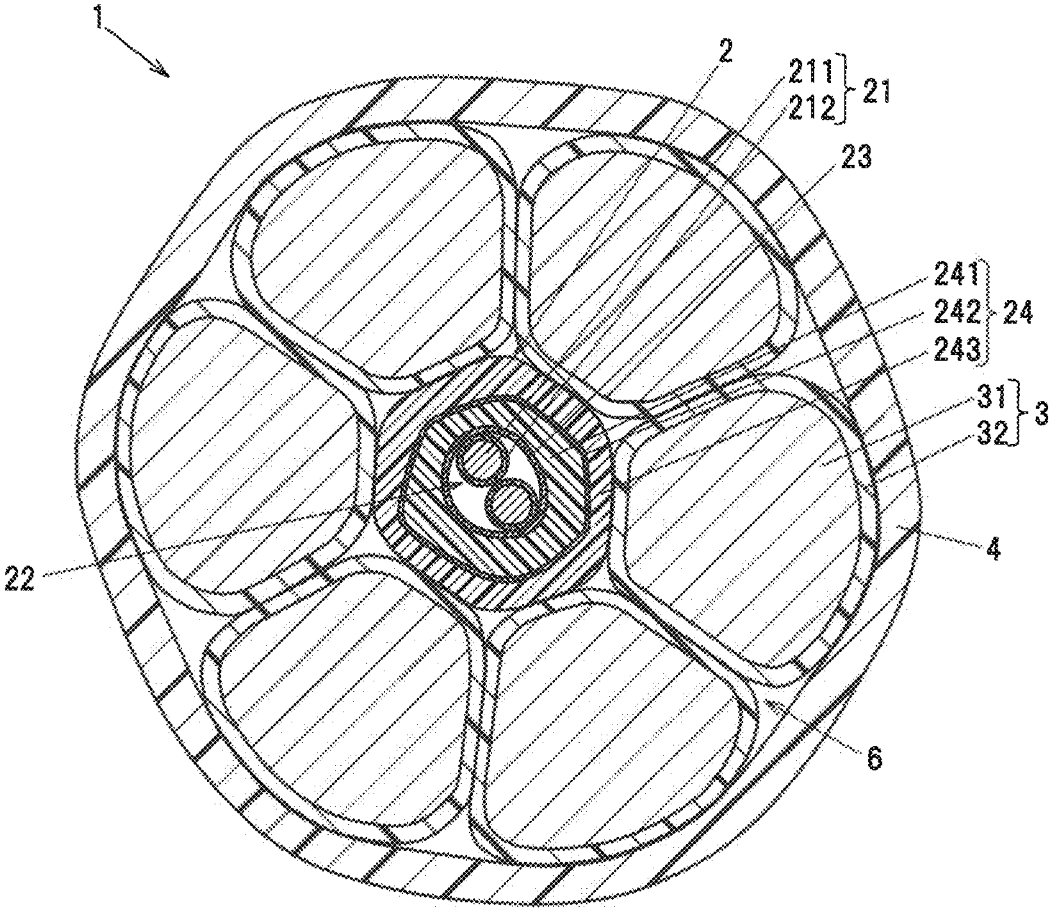
FIG. 1 is a cross-sectional view showing a cross-section perpendicular to a cable longitudinal direction of a multi-core cable in an embodiment of the present invention.

FIG. 1 is a cross-sectional view showing a cross-section perpendicular to a cable longitudinal direction of a multi-core cable in an embodiment of the present invention.

Figure 2:
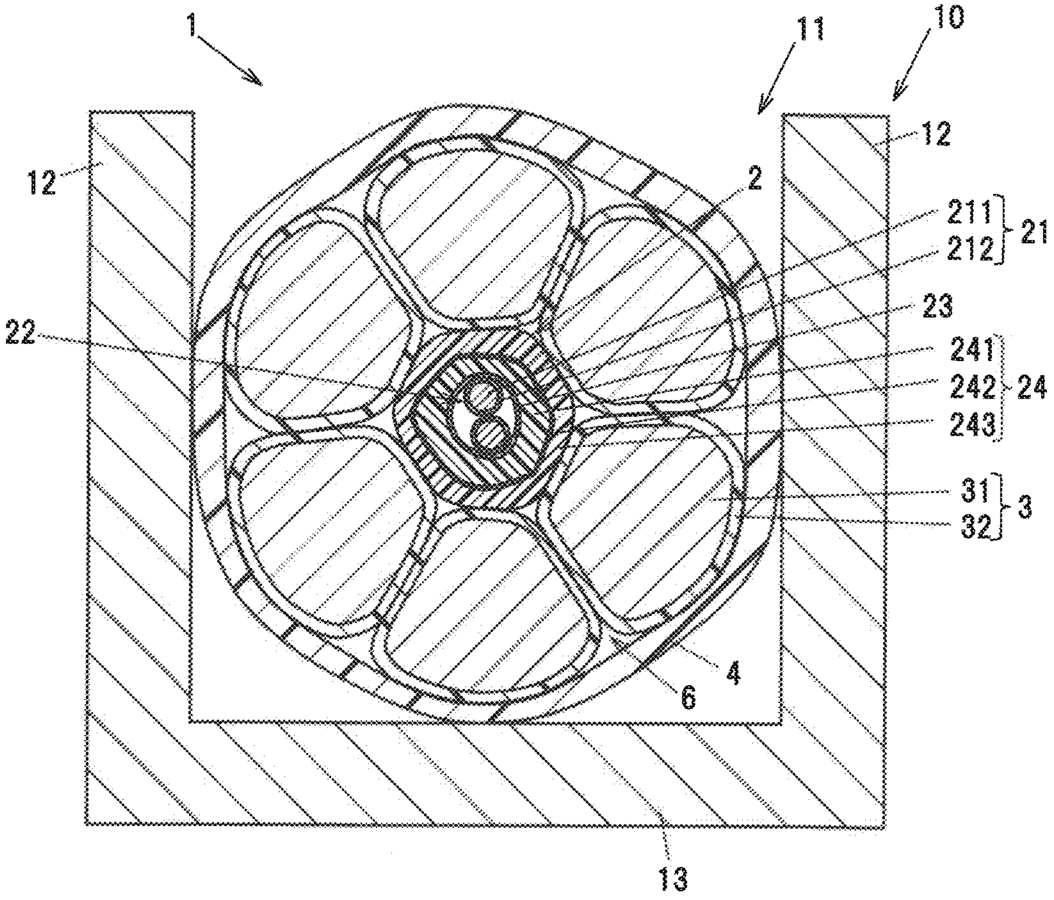
FIG. 2 is a cross-sectional view of the multi-core cable shown in FIG. 1 which is accommodated in a groove of a housing.

FIG. 2 is a cross-sectional view of the multi-core cable shown in FIG. 1 which is accommodated in a groove of a housing.

As shown in FIGS. 1 and 2, a multi-core cable 1 includes a heat detection line (i.e., a linear heat detector, a heat detecting wire) 2, a plurality of electric wires (i.e., power lines for supplying a large electric current) 3, and a sheath 4 for covering the heat detection line 2 and the plurality of electric wires 3 together.

This multi-core cable 1 is used to provide an electric current in a non-contact manner (for contactless power supplies) and is housed in a groove 11 of a housing 10. In the present embodiment, the housing 10 has a pair of side walls 12 arranged in parallel and a bottom wall 13 perpendicular to the side walls 12 for connecting the ends of side walls 12. The housing 10 as a whole is formed in U-shape (i.e., one-side opened rectangular shape) in a cross-sectional view. In this cross-section, the groove 11 is a space having a rectangular shape in a cross-sectional view that is surrounded by the pair of side walls 12 and the bottom wall 13, and is opened on the opposite side of the bottom wall 13.

(Heat detection line 2) The heat detection line 2 includes a twisted pair wire 22 composed of a pair of heat detecting wires 21 being twisted together, a binder tape 23 wrapped spirally around the twisted pair wire 22, and a jacket 24 covering around the binder tape 23.

Each of the pair of heat detecting wires 21 constituting the twisted pair wire 22 includes a first conductor 211, and a first insulator 212 for covering around the first conductor 211. As for the first conductor 211, it is preferable to use a conductor which can increase a force that allows the first conductors 211 to move closer to each other toward a center of the twisted pair wire 22 when the first conductors 211 are twisted together as the twisted pair wire 22.

As mentioned above, the multi-core cable 1 is used for contactless power supplies and is routed over long distances, for example 30 m or more, at factories. Therefore, the electrical conductivity of the first conductor 211 must be maintained high enough to detect a short circuit between the first conductors 211, 211, even over long distances. The first conductor 211 should be strong enough to ensure that wiring over long distances does not cause an open circuit (i.e., wire break). For the heat detection line 2 in the present embodiment, an outer diameter of the first conductor 211 is preferably 0.5 mm or more and 1.0 mm or less. By setting the outer diameter of the first conductor 211 to 0.5 mm or more, the conductor resistance is suppressed and the electrical conductivity is maintained high, allowing detection of the short circuit between the first conductors 211, 211 even over long distances. Also, by setting the outer diameter of the first conductor 211 to 0.5 mm or more, it is possible to suppress the deterioration in force of the first conductors 211, 211 to move closer to each other and the reduction in detection sensitivity, thereby improving the detection sensitivity of the temperature in the cable. On the other hand, by setting the outer diameter of the first conductor 211 to 1.0 mm or less, it is possible to suppress the hardening (induration) of the multi-core cable 1 and the difficulty of bending it, thus making it possible to achieve the multi-core cable 1 which is easy to route.

Further, in the heat detection line 2 in the present embodiment, the first conductor 211 is non-magnetic and composed of copper alloy having a tensile strength of 900 MPa or more. More specifically, the first conductor 211 is composed of phosphor bronze including tin (Sn) of 7 mass % or more and 10 mass % or less, and phosphor (P) of 0.03 mass % or more and 0.35 mass % or less. By using a non-magnetic material as the first conductor 211, it is possible to suppress the loss in contactless power supplies and to reduce the efficiency of the contactless power supplies.

In addition, by setting the tensile strength of the first conductor 211 to 900 MPa or more (preferably 930 MPa or more, more preferably 990 MPa or more), it is possible to increase the force of the first conductors 211, 211 to move closer to each other toward the center of the twisted pair wire 22 in the state where the first conductors 211, 211 of the twisted pair wire 22 are twisted together. As a result, as soon as the first insulators 212, 212 soften and melt, the first conductors 211, 211 move toward the center of the twisted pair wire 22 and contact each other. This contact enables the detection sensitivity of the temperature in the cable to be improved. Further, by setting the tensile strength of the first conductor 211 to 900 MPa or more, it is possible to ensure an enough strength that wiring over long distances will not cause the open circuit (wire break). In addition, it is preferable that the elongation of the first conductor 211 of the twisted pair wire 22 is 10% or less (more preferably, 3% or less) from the viewpoint of increasing the force that the two first conductors 211, 211 move closer to each other toward the center of the twisted pair wire 22 to improve the sensitivity of detection. The tensile strength and elongation of the first conductor 211 are measured by the tensile test method (test piece No. 9B) in accordance with JISZ2241 (2011).

In the present embodiment, a single wire composed of a tin (Sn)-plated phosphor bronze having a diameter of 0.63 mm is used as the first conductor 211. The copper alloy for the first conductor 211 is not limited to phosphor bronze, and e.g., brass (Cu—Zn alloy), beryllium copper (BeCu), or the like may be used. However, it is more preferable to use phosphor bronze, which can increase the force allowing the first conductors 211, 211 of the twisted pair wire 22 to move closer to each other toward the center of twisted pair wire 22, and which is less expensive and less likely to cause the break of the wire.

As the first insulator 212, a relatively low melting point insulating resin is used to melt when the temperature in the cable rises. More specifically, the first insulator 212 is configured to melt before a second insulator 32 of an electric wire 3 (to be described below) melts due to the heat generated when the temperature in the cable rises due to overcurrent, etc., (i.e., in such a manner that the overcurrent generated by the first conductor 211 can be detected before the function of the electric wire 3 is lost due to the heat generated at the time of the temperature rise as described above). The melting point of the first insulator 212 is lower than the melting point of the second insulator 32 of the electric wire 3 (e.g., 105° C. or more). In the present embodiment, the goal was to operate at 100° C. for a few minutes (within 5 minutes) without operating at 80° C. or less, and the melting point of the first insulator 212 is set to be higher than 80° C. and less than 100° C. (more preferably, around 90° C.). Here, the first insulator 212 consisting of an ionomer resin with a melting point of about 89° C. is used.

A thickness of the first insulator 212 is 0.1 mm or more and 0.3 mm or less. By setting the thickness of the first insulator 212 to 0.1 mm or more, it is possible to ensure the mechanical strength of the first insulator 212 and suppress unintentional damage to the first insulator 212, thereby suppress malfunction of the heat detection line 2. Also, by setting the thickness of the first insulator 212 to 0.3 mm or less, it is possible to quickly make contact between the first conductors 211, 211 when the first insulator 212 softens or melts, which suppresses the failure of contact between the first conductors 211, 211 even though the temperature in the cable is increasing. In the present embodiment, the thickness of the first insulator 212 is set to 0.14 mm, and an outer diameter of the heat detecting wire 21 is set to 0.91 mm so that an outer diameter of the twisted pair wire 22 composed of two heat detecting wires 21 twisted together is 1.82 mm.

In the first insulator 212, a thickness of a contacting portion which contacts each of the pair of heat detecting wires 21 constituting the twisted pair wire 22 (a contacting portion between the first insulators 212 of the pair of heat detecting wires 21 constituting the twisted pair wire 22) is preferably smaller than a thickness of a non-contacting portion which does not contact each of the pair of heat detecting wires 21 constituting the twisted pair wire 22 (a non-contacting portion between the first insulators 212 of the pair of heat detecting wires 21 constituting the twisted pair wire 22). This allows the first conductors 211, 211 to contact each other as soon as the first insulator 212 softens or melts, and helps to suppress the problem of the failure in contact between the first conductors 211, 211, even though the temperature in the cable has increased. In this case, the contacting portions where respective ones of the pair of heat detecting wires 21 constituting the twisted pair wire 22 preferably come into contact with each other to have a surface contact (face-contact). Here, the thickness is a minimum distance (minimum thickness) between an inner surface of the first insulator 212 and an outer surface of the first insulator 212.

Figure 3A:
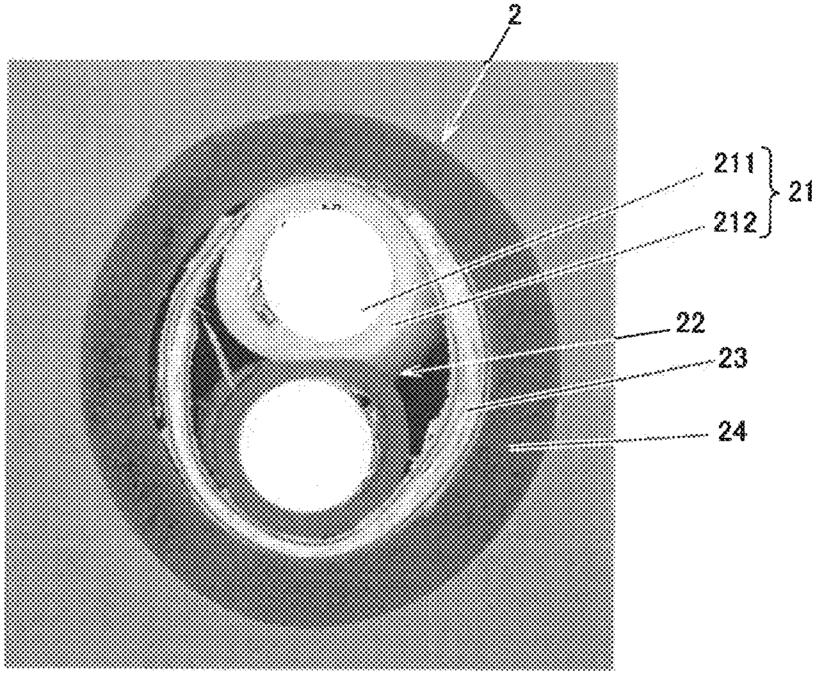
FIGS. 3A and 3B are pre-operation and post-operation photographic images for explaining an operation of a heat detection line.
Figure 3B:
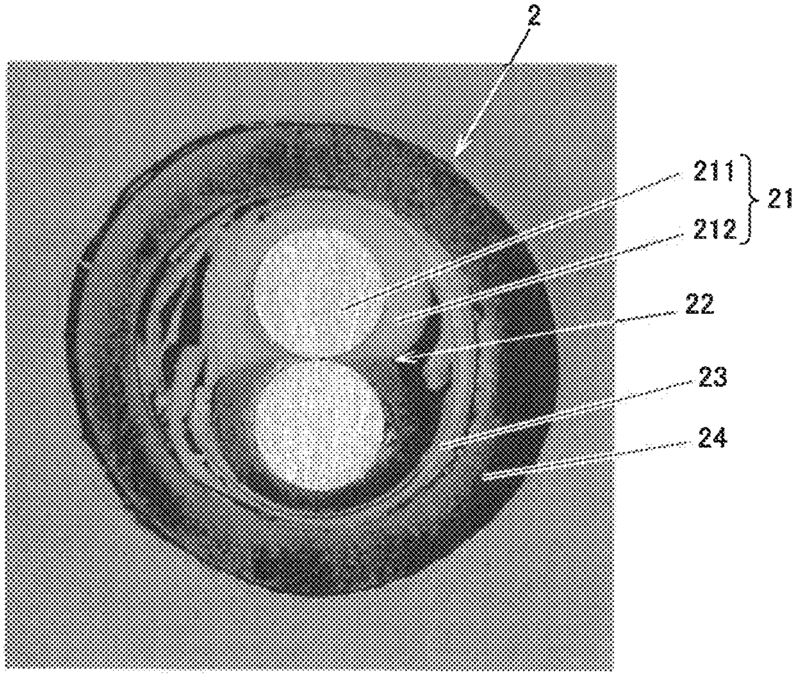

FIGS. 3A and 3B are pre-operation and post-operation photographic images for explaining an operation of the heat detection line 2. As shown in FIGS. 3A and 3B, in the heat detection line 2, the temperature in the cable (the temperature around the electric wire 3) rises equal to or above the melting point of the first insulator 212 (89° C. in this case) and below the melting point of the second insulator 32, and this heat causes the first insulator 212 to soften and melt. Then, the force of the twisted first conductors 211, 211 to move closer to each other toward the center of the twisted pair wire 22 moves the first conductors 211, 211 toward the center of the twisted pair wire 22 to contact each other, resulting in an electrical short circuit. In this case, the first insulator 212 is fused, and the force between the first conductors 211, 211 to move closer to each other pushes out the first insulators 212, 212 which exist between the first conductors 211, 211 from the vicinity of the center of the twisted pair wire 22. Therefore, the outline of the first insulator 212 is not circular, and the contacting portion where one first insulator 212 contacts the other first insulator 212 is slightly flattened. By detecting a short circuit between the two first conductors 211, 211, it is possible to detect an increase in temperature in the multi-core cable 1 due to overcurrent or the like. In the photographic images in FIGS. 3A and 3B, an epoxy resin is packed around the heat detection line 2 to make it easier to identify the state of a cut end surface of the heat detection line 2. After polishing the cut end surface, the photographic images of the cut end surface were taken. Also, in FIGS. 3A and 3B, the jacket 24 is one layer. The heat detection line 2 operates in the same manner as described above even when the jacket 24 has three layers as shown in FIGS. 1 and 2.

By the way, in this heat detection line 2, the temperature around the heat detection line 2 increases, so that the first insulator 212 softens to close the distance between the two first conductors 211, 211, and the resistance value and the capacitance between the two first conductors 211, 211 change, before the two first conductors 211, 211 are short-circuited. Therefore, by measuring the resistance and/or the capacitance between the two first conductors 211, 211, it is possible to detect that the temperature around the heat detection line 2 is increasing before the two first conductors 211, 211 are short-circuited.

Moreover, although not shown, the first insulator 212 may have a multi-layered structure including plural layers of an insulating resin composition. For example, by using the first insulator 212 with a two-layer structure and setting a melting point of an inner layer to be higher than a melting point of an outer layer, it is possible to detect the temperature rise in the multi-core cable 1 gradually (i.e., in stages).

In addition, if the first insulator 212 is multilayered, at least one layer other than the one closest to the first conductor 211 may include a particulate matter with a higher melting point than a melting point of the insulating resin used for the first insulator 212. The inclusion of a particulate matter with a high melting point in the first insulator 212 suppresses that the particulate matter is pushed in by the force of the first conductors 211, 211 to move closer to each other and left thinly on the first insulator 212, when the temperature around the heat detection line 2 increases. As a result, it is possible to generate a short circuit between the first conductors 211, 211 easily. Electrically conductive materials are preferred as the particulate matter, because the insulating property of the particulate matter may cause the particulate matter to be trapped between the first conductors 211, 211, thereby preventing short circuits. For example, carbon particles can be used as the particulate matter.

A twist pitch of the twisted pair wire 22 is preferably approximately 20 times (18 times or more and 22 times or less) the outer diameter of the heat detecting wire 21. According to this configuration, it will be possible to maintain the force of the first conductors 211, 211 to move closer to each other, while it will be possible to suppress the break of the first insulator 212 by the force. It should be noted that the twist pitch of the twisted pair wire 22 is an interval between longitudinal positions of an arbitrary heat detecting wire 21 in a longitudinal direction of the twisted pair wire 22.

For the binder tape 23 to be wrapped around the twisted pair wire 22, a resin tape such as polyester tape may be used, for example. The binder tape 23 is wrapped spirally around the twisted pair wire 22 in such a manner that side edges in its width direction will partially overlap.

(Jacket 24) The jacket 24 plays a role as a protective layer that protects the twisted pair wire 22, plays a role as a core material when the electric wires 3 are twisted together, and plays a role as an outer covering of the heat detection line 2 exposed at the cable end.

Here, the heat detection line 2 exposed at the cable end is connected to a detection device (not shown) that detects an electrical short due to the contact between the first conductors 211, 211. The outer diameter of the heat detection line 2 connected to this detection device is specified by standards or the like. However, the specified outer diameter of the heat detection line 2 is different from the outer diameter required to fill the gap between the electric wires 3, 3 (i.e., the outer diameter required to serve as a core material) in some cases. In particular, when the conductor cross-sectional area of the electric wire 3 is increased in order to reduce the conductor resistance, the gap (space) between the electric wires 3, 3 formed at the cable center is accordingly enlarged. The required outer diameter of the heat detection line 2 for filling this gap is also increased. If the outer diameter of the heat detection line 2 is made smaller than the gap (space) between the electric wires 3, 3, the symmetry is lost when the electric wires 3 are twisted around the heat detection line 2, and the uniformity of the current distribution is impaired. As a result, AC resistance to high-frequency (5 kHz or higher, for example, about 10 kHz) AC increases.

Therefore, the present inventors first contemplated making the jacket 24 into a two-layer structure including an inner layer and an outer layer composed of a polyvinyl chloride resin, and peeling off and removing the outer layer from the inner layer at the exposed heat detection line 2 at the time of terminal processing to provide the heat detection line 2 with a specified outer diameter. As a result of studies by the present inventors, the outer layer could be peeled off from the inner layer by forming the outer layer by tube extrusion. However, the present inventors found that, when the outer layer is formed by tube extrusion, the unevenness of the surface of the inner layer due to the twisting of the twisted pair wire 22 may cause a gap between the inner layer and the outer layer, or the unevenness on the surface of the inner layer may appear (i.e., be transferred) even on the surface of the outer layer. As a result, when the electric wires 3 are twisted around the heat detection line 2, the symmetry of the arrangement of the electric wires 3 is lost, the uniformity of the current distribution is impaired, and the AC resistance to high-frequency (5 kHz or higher, for example, about 10 kHz) AC increases. On the other hand, by forming the outer layer by insertion extrusion or solid extrusion, the roundness of the outer layer (i.e., the roundness of the outer layer surface in the cross-section perpendicular to the cable longitudinal direction) could be increased, thereby improving the symmetry of the electric wire arrangement. However, in this case, it has become difficult to peel off the outer layer from the inner layer. In order to solve such a problem, the present inventors conducted extensive studies, and as a result, conceived of forming an intermediate layer between the inner layer and the outer layer, from which the outer layer can be peeled off.

That is, in the multi-core cable 1 according to the present embodiment, the jacket 24 of the heat detection line 2 has an inner layer 241, an outer layer 243, and an intermediate layer 242 provided between the inner layer 241 and the outer layer 243. The intermediate layer 242 has a melting point higher than a melting point of the inner layer 241 and a melting point of the outer layer 243, and the outer layer 243 is configured to be peelable from the intermediate layer 242. As a result, the outer layer 243 can be formed by insertion extrusion or solid extrusion to increase the roundness of the outer layer 243, improve the symmetry of the arrangement of the electric wires 3, improve the uniformity of the current distribution, and reduce the AC resistance to the high-frequency AC. It is also possible to peel off the outer layer 243 from the intermediate layer 242 and set the outer diameter of the heat detection line 2 exposed at the cable end to a specified outer diameter. Each layer of the jacket 24 will be described in detail below.

The inner layer 241 is composed of an insulating resin composition having a higher melting point than the first insulator 212 so as not to melt before the first insulator 212 melts. However, if the inner layer 241 is too thick, the first insulator 212 may melt due to the heat generated when the inner layer 241 is molded. Therefore, the thickness of the inner layer 241 must be set in consideration of the melting point (i.e., molding temperature) of the inner layer 241 in such a manner that the first insulator 212 does not melt during extrusion molding. In the present embodiment, a resin composition including a lead-free heat-resistant vinyl (polyvinyl chloride) resin as a main component is used for the inner layer 241. In this case, the thickness of the inner layer 241 is preferably 5 times or less the thickness of the first insulator 212 (here, 0.14 mm), and is preferably 0.7 mm or less. Here, the inner layer 241 has a thickness of 0.45 mm and an outer diameter of 2.82 mm. The inner layer 241 is formed by non-solid extrusion (so-called tube extrusion). After the inner layer 241 is molded, it is preferable to suppress melting of the first insulator 212 by immediately performing a cooling treatment with cooling water or the like.

As with the inner layer 241, the intermediate layer 242 is composed of an insulating resin composition having a higher melting point than the first insulator 212 so as not to melt before the first insulator 212 melts. In the present embodiment, the intermediate layer 242 serves to enhance the peelability of the outer layer 243 and is the outermost layer of the heat detection line 2 exposed at the cable end. Therefore, the intermediate layer 242 is composed of an insulating resin composition that has a higher melting point than the outer layer 243 and is easily peeled off from the outer layer 243. Note that in the present embodiment, the melting point of the intermediate layer 242 is higher than both the melting point of the inner layer 241 and the melting point of the outer layer 243.

Although the details will be described later, in the present embodiment, a resin composition including a polyvinyl chloride resin as a main component is used for the outer layer 243, so the intermediate layer 242 is composed of a resin composition including a fluororesin having high peelability with respect to the polyvinyl chloride resin as the main component. As a result, even if the outer layer 243 is molded by insertion extrusion or solid extrusion with a high degree of adhesion, the outer layer 243 can be easily peeled off and removed from the intermediate layer 242.

As the fluororesin constituting the intermediate layer 242, e.g., ETFE (tetrafluoroethylene-ethylene copolymer), FEP (tetrafluoroethylene-hexafluoropropylene copolymer), PFA (tetrafluoroethylene-perfluoroalkoxyethylene copolymer) and the like can be used. Among them, it is more preferable to use ETFE and FEP, which have a melting point of 250° C. or more and less than 300° C. for the intermediate layer 242. This is to prevent the first insulator 212 from melting during the molding of the intermediate layer 242. In the present embodiment, ETFE is used as the fluororesin constituting the intermediate layer 242. Since ETFE has a relatively high hardness among fluororesins, it is possible to increase the roundness of the outer layer 243 when the outer layer 243 is formed on the outer periphery of the intermediate layer 242 by insertion extrusion or solid extrusion, and to maintain the outer diameter of the heat detection line 2 at a desired outer diameter when the plurality of electric wires 3 are formed around the heat detection line 2. Therefore, it is possible to improve the symmetry of the arrangement of the plurality of electric wires 3, and it is easy to maintain the outer diameter of the heat detection line 2 exposed at the cable end at a specified outer diameter.

If the intermediate layer 242 is too thick, the first insulator 212 may melt due to the heat during molding, and the entire multi-core cable 1 becomes hard and difficult to bend. It is desirable to make the thickness of the intermediate layer 242 as thin as possible. Specifically, it is desirable that the thickness of the intermediate layer 242 is at least 50% or less of the thickness of the inner layer 241, and more preferably about ⅓ of the thickness of the inner layer 241. In the present embodiment, the thickness of the intermediate layer 242 is 0.14 mm and the outer diameter of the intermediate layer 242 is 3.1 mm, which is the specified outer diameter for connection to the detection device. The intermediate layer 242 is formed by non-solid extrusion (so-called tube extrusion).

As with the inner layer 241 and the intermediate layer 242, the outer layer 243 is composed of an insulating resin composition having a higher melting point than the first insulator 212 so as not to melt before the first insulator 212 melts. In the present embodiment, the outer layer 243 fills the gap between the intermediate layer 242 and the electric wires 3 surrounding the intermediate layer 242, and serves to increase the roundness of the outer shape of the heat detection line 2. Since the inner layer 241 and the intermediate layer 242 are formed by tube extrusion molding, the surface of the intermediate layer 242 is affected by the twist of the heat detecting wires 21, and unevenness corresponding to the twist appears on the surface of the intermediate layer 242. In order to prevent the formation of a gap between the intermediate layer 242 and the outer layer 243 due to the unevenness, and to finish the surface of the outer layer 243 in a shape without unevenness according to the twist of the heat detecting wires 21, the outer layer 243 is molded by insertion extrusion or solid extrusion, which increases the degree of adhesion to the intermediate layer 242.

By increasing the roundness of the outer shape of the outer layer 243 (i.e., keeping the outer shape of the heat detection line 2 as close to a circle as possible), a pressing force generated between the electric wires 3 and the heat detection line 2 due to the pressing of the sheath 4, which will be described later, becomes substantially uniform for the respective electric wires 3 and all the electric wires 3 are uniformly deformed. As a result, as shown in FIG. 1, the symmetry of the structure of the entire multi-core cable 1 when viewed in cross-section is enhanced. Note that, for example, if the outer shape of the heat detection line 2 arranged at a cable center (i.e., a center of the multi-core cable 1) is elliptical or has unevenness corresponding to the twist of the heat detecting wires 21, variation in the outer shape of the electric wires 3 arranged around the heat detection line 2 becomes large, so that current loss (difficulty in flowing) differs for each wire 3. Namely, the current distribution becomes non-uniform when a high-frequency (5 kHz or higher, for example, about 10 kHz) AC is applied. If the current distribution becomes non-uniform, the AC resistance increases and the efficiency of contactless power supply decreases.

In other words, when the plurality of electric wires 3 are twisted around the heat detection line 2, the outer shape of the heat detection line 2 is kept as close to a circular shape as possible, so that it is possible to uniformize the cross-sectional shape of the plurality of electric wires 3 twisted together around the heat detection line 2 (i.e., to reduce variation in the outer shapes of the plurality of electric wires 3), as shown in FIG. 1. In a state in which the plurality of electric wires 3 are twisted around the heat detection line 2 arranged at the cable center and the sheath 4 is provided, the heat detection line 2 is pressed toward the cable center by the plurality of electric wires 3. In fact, the outer shape of the heat detection line 2 becomes non-circular (i.e., an outer surface of a portion of the outer layer 243, which contacts the electric wire(s) 3, is pushed toward the cable center) as shown in FIG. 1. In the present embodiment, the heat detection line 2 is pressed by the six electric wires 3 so that the outer shape of the heat detection line 2 is substantially hexagonal.

Figure 4A:
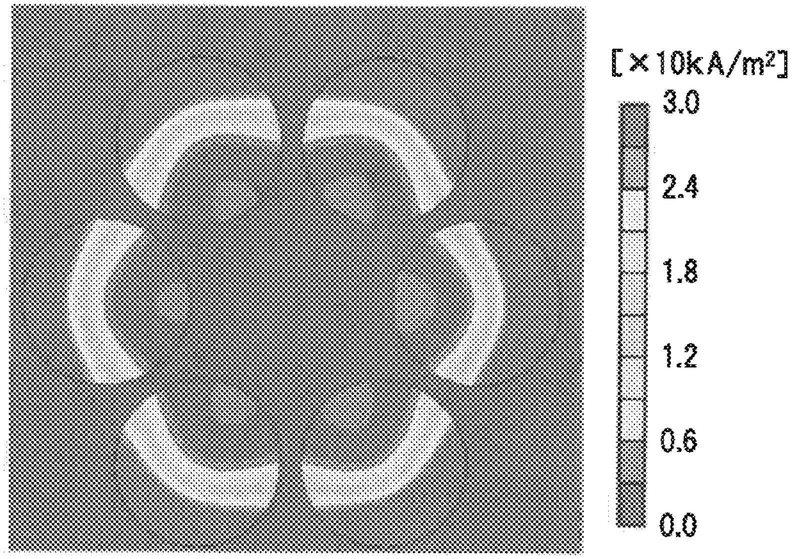
FIGS. 4A and 4B are diagrams showing simulation results of current distribution.
Figure 4B:
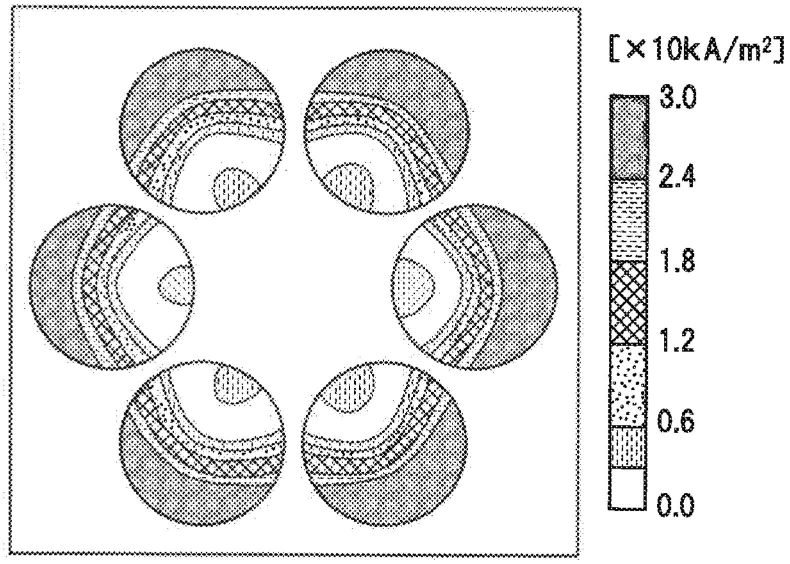

FIGS. 4A and 4B are diagrams showing simulation results of a current distribution when six conductors with the same cross-sectional shape and the same cross-sectional area are arranged uniformly around the cable center (the heat detection line 2), and an alternating current of 1 ampere in total for the six conductors (1/6 ampere for each conductor) at a frequency of about 10 kHz flowed. FIG. 4A is an original color drawing in grayscale, and FIG. 4B is a drawing in which the color difference in the original drawing is replaced by the hatching difference. As understood from the simulation results shown in FIGS. 4A and 4B, by arranging the six conductors (i.e., the electric wires 3) with a uniform cross-sectional shape and a uniform cross-sectional area around the heat detection line 2, larger current flows through an outer side (i.e., outer sheath-side) of each conductor and the current distribution for each conductor is uniform. By making the current distribution uniform, it is possible to suppress the increase in the AC resistance due to the non-uniform current distribution, thereby reducing the AC resistance.

Returning to FIGS. 1 and 2, the outer layer 243 is pressed against the electric wires 3 when the electric wires 3 are twisted around the outer layer 243. Therefore, it is desirable to use a resin composition with relatively high hardness so as to minimize deformation of the outer layer 243 when the electric wires 3 are pressed and to keep the outer shape of the heat detection line 2 as close to a circle as possible. It is desirable to use a resin composition having a higher hardness than at least the inner layer 241. More specifically, the hardness of the outer layer 243 is preferably 55 or more and less than 60 in Shore D hardness measured according to JIS K7215 Type D. The hardness of the inner layer 241 is lower than the hardness of the outer layer 243, for example, 30 or more and 35 or less in Shore D hardness. The hardness of the intermediate layer 242 is harder than those of the inner layer 241 and the outer layer 243, and is, for example, 60 or more and 70 or less in Shore D hardness. The heat detection line 2 has the jacket 24 consisting of three layers (the inner layer 241, the intermediate layer 242, and the outer layer 243) each having the hardness described above, thereby improving the symmetry of the arrangement of the plurality of electric wires 3 (As shown in FIG. 1, the cross-sectional shape of the plurality of electric wires 3 twisted around the heat detection line 2 can be made uniform). As a result, in the multi-core cable 1, when a high-frequency (for example, 5 kHz or higher) AC flows, the current distribution in the plurality of electric wires 3 becomes uniform, and the AC resistance can be reduced.

In the present embodiment, the outer layer 243 composed of a resin composition including a semi-rigid lead-free vinyl (polyvinyl chloride) resin as a main component is used. The thickness of the outer layer 243 is appropriately adjusted in consideration of the outer diameter and the number of electric wires 3 to be used so that the outer diameter is suitable for the space at the cable center. In the present embodiment, the thickness of the outer layer 243 is set to 0.35 mm, and the outer diameter of the outer layer 243, that is, the outer diameter of the entire heat detection line 2 is set to 3.8 mm.

(Electric wire 3) Each of the electric wires 3 includes a second conductor 31 composed of a stranded wire conductor formed by collectively twisting multiple strands, and a second insulator 32 covering the second conductor 31. Six electric wires 3 are of the same structure. In the present embodiment, as the strand (elementary wire) for the second conductor 31, a tin (Sn)-plated soft copper wire is used. An outer diameter of the strand used for the second conductor 31 is preferably 0.15 mm or more and 0.32 mm or less. If the outer diameter of the strand is less than 0.15 mm, it is likely that the wire breaks will occur. Meanwhile, if the outer diameter of the strand is more than 0.32 mm, the strand may protrude through the second insulator 32 when the second insulator 32 is thin.

As a method of twisting the strands, so-called "concentric twisting" method of twisting plural strands around a strand has been known. If this method is used to form the second conductor 31, the strands will be twisted together in a stable state, and the shape of the second conductor 31 will be less deformed by the external force for housing the multi-core cable 1 into the groove 11. Therefore, the second conductor 31 should be formed by so-called "collective twisting" method of twisting strands all together so that the external force for housing the multi-core cable 1 into the groove 11 can easily change the shape of the second conductor 31. In the present embodiment, one hundred thirty-six (136) strands each having the outer diameter of 0.26 mm are twisted collectively to form the second conductor 31 having a conductor cross-sectional area of 7 $mm^2$ or more and 8 $mm^2$ or less. The outer diameter of the second conductor 31 is approximately 3.47 mm.

In order to increase the cross-sectional area of the conductor part in the multi-core cable 1, it is preferable that the second insulator 32 of each electric wire 3 is as thin as possible. More specifically, the thickness of the second insulator 32 should be half (1/2) or more and 1 time or less the outer diameter of the strand used for the second conductor 31. If the thickness of the second insulator 32 is less than 1/2 of the outer diameter of the strand, the external force of housing the multi-core cable 1 into the groove 11 may cause the strand to break through the second insulator 32. If the thickness of the second insulator 32 exceeds 1 time the outer diameter of the strand, the electric wire 3 will be large in diameter, which leads to the increase in diameter of the entire multi-core cable 1. In the present embodiment, the thickness of the second insulator 32 is approximately 0.2 mm (approximately 0.77 times of the outer diameter of the strand). It is preferable that the second insulator 32 of each electric wire 3 is composed of the same material and a single layer, in order to minimize the thickness. Further, in order to enable contactless power supplies with a larger current, it is preferable that the same power current is supplied to the respective second conductors 31 of the electric wires 3.

The second insulator 32 can be formed by thin wall molding method. As the second insulator 32, it is preferable to use a material that is harder than the jacket 24 and more resistant to an external pressure (which is less likely to deform due to the external force for housing the multi-core cable 1 into the groove 11), so as to facilitate the elastic deformation of the jacket 24 of the heat detection line 2. For example, fluoropolymers such as ETFE (tetrafluoroethylene-ethylene copolymer), FEP (tetrafluoroethylene-hexafluoropropylene copolymer), PTFE (polytetrafluoroethylene), PVDF (polyvinylidene difluoride), polyimide, PEEK (polyetherether ketone) can be used for the second insulator 32. More preferably, fluorine resins having a good surface slidability may be used as the second insulator 32. This makes it easier for the electric wires 3 to move within the sheath 4 and makes it easier to insert the multi-core cable 1 into the groove 11, when the external force is applied. Here, the second insulator 32 composed of ETFE was used.

The second insulator 32 is formed by non-solid extrusion molding (so-called tube extrusion molding). As a result, the second insulator 32 does not securely and closely contact the strands. This makes it possible for the strands to move each other within the second insulator 32, thereby making it easier to deform the cross-sectional shape of the electric wire 3 when the external force is applied. Therefore, it is easier to insert the multi-core cable 1 into the groove 11.

In the multi-core cable 1 according to the present embodiment, the second conductor 31 is formed in such a manner that the shape of the second conductor 31 in the cross-section perpendicular to the cable longitudinal direction is non-circular. More specifically, the second conductor 31 is formed in a substantially fan shape where a width along a circumferential direction is gradually increased from a radially inward portion to a radially outward portion. This makes it possible to increase a cross-sectional area of the second conductor 31 as much as possible in a limited space within the sheath 4. Further, the current flowing in the second conductor 31 passes through an outward portion (an outer periphery region, i.e., a portion around an outer periphery portion 3*c* to be described later) in the cable radial direction of the second conductor 31. By providing the second conductor 31 with a cross-sectional shape where the width along the circumferential direction is gradually increased from the radially inward portion to the radially outward portion, the size (the cross-sectional area and the surface area) of the second conductor 31 is increased in the outer periphery region to which the electric current is concentrated (see FIGS. 4A and 4B). According to this configuration, in the multi-core cable 1, it is possible to suppress the current loss in the second conductor 31, thereby contribute to the improvement in efficiency of the contactless power supplies.

The cross-sectional shape of the electric wire 3 as a whole, including the second conductor 31, is non-circular by being pressed by sheath 4 to be described later. More specifically, a part of the outer surface of the electric wire 3 is brought into surface contact with the outer surface of the heat detection line 2. Further, in the multi-core cable 1, the electric wires 3 adjacent to each other in the circumferential direction are brought into surface contact with each other. The portion brought into surface contact has a flat surface substantially along the cable radial direction. Further, a part of the outer surface of the electric wire 3 is formed in a shape along the inner surface of the sheath 4 and directly contacts the inner surface of the sheath 4.

In addition, for example, it is conceivable to spirally wind the binder tape around the electric wires 3, but the outer diameter of the cable is limited due to insertion into the groove 11. If the binder tape is provided, the conductor cross-sectional area of the second conductor 31 needs to be reduced to provide the space for the binder tape, which contributes to an increase in conductor resistance. Therefore, it is desirable to have a structure in which the electric wires 3 and the sheath 4 are in direct contact with each other without using the binder tape. If it is necessary to keep the electric wires 3 being twisted together for manufacturing reasons, it may be necessary to wrap threads (such as resin threads or cotton threads) spirally around the electric wires 3 being twisted together.

(Assembly 6) On the outer periphery of the heat detection line 2, the electric wires 3 are twisted spirally. Hereinafter, an aggregate comprising the electric wires 3 twisted around the heat detection line 2 is referred to as an assembly 6.

If the number of the electric wires 3 used for the assembly 6 is from one to three, the multi-core cable 1 will hardly be deformed by the external force. For this reason, the number of the electric wires 3 used for the assembly 6 is four or more in the multi-core cable 1. In the present embodiment, the number of the electric wires 3 used for the assembly 6 is six, with which the narrowest outer diameter and the lowest sum of the conductor resistance of all the electric wires 3 can be provided. In the assembly 6, the electric wires 3 adjacent to each other in the cable circumferential direction are brought into surface contact with each other. Further, the electric wire 3 is brought into surface contact with the heat detection line 2 and the sheath 4.

It is preferable that a twisting direction of the assembly 6 is opposite to a twisting direction of the twisted pair wire 22 in the heat detection line 2. By reversing the twisting direction of the assembly 6 and the twisting direction of the twisted pair wire 22, the twist of the electric wires 3 is less likely to loosen, and it is possible to keep the heat detection line 2 being tightened by the electric wires 3. As a result, when the temperature in the multi-core cable 1 increases, the tightening of the electric wires 3 makes it easier for the first conductors 211 to come into contact with each other, thereby increasing the sensitivity in detection. The twisting direction of the assembly 6 is the direction in which the electric wires 3 are rotated from one end to the other end of the assembly 6 when viewing the assembly 6 from the one end. The twisting direction of the twisted pair wire 22 is the direction in which the heat detecting wires 21 are rotated from one end to the other end of the twisted pair wire 22 when viewed from the one end of the twisted pair wire 22.

A fibrous filler may be provided between the heat detection line 2 and the electric wires 3, and between the electric wires 3 and the sheath 4. It is preferable to use a filler with high heat resistance (at least the heat-resistant temperature is 100° C. or higher) in order to suppress the possibility of the burning of the filler due to the temperature rise in the multi-core cable 1. By providing the filler, the overall outline of the multi-core cable 1 can be closer to a circular shape, thereby improving the usability. In the present embodiment, no fibrous filler is provided between the heat detection line 2 and the electric wires 3, and between the electric wires 3 and the sheath 4. This is to suppress the possibility of burning of the filler due to elevated temperature, and to ensure a space where the electric wire 3 can move in the circumferential direction and in the radial direction (radially outwardly) of the heat detection line 2, when the external force is applied to the multi-core cable 1.

(Sheath 4) The sheath 4 is provided around the assembly 6. In the multi-core cable 1 according to the present embodiment, the sheath 4 is thinned to increase the conductor cross-sectional area of the electric wires 3 while maintaining the cable outer diameter, thereby reducing the conductor resistance. Therefore, as the sheath 4, it is necessary to use a resin composition that does not easily break due to wear even if it is thin.

In the present embodiment, the sheath 4 is composed of a resin composition comprising a polymer alloy including a polyvinyl chloride resin and urethane thermoplastic elastomer (i.e., PUV: Polymer alloy with thermoplastic polyurethane and soft polyvinyl chloride) as a base polymer. The base polymer constituting the resin composition preferably includes 20 parts by mass or more and 230 parts by mass or less of the urethane thermoplastic elastomer with respect to 100 parts by mass of the polyvinyl chloride resin. In the multi-core cable 1, since the sheath 4 is composed of the resin composition described above, the abrasion resistance of the sheath 4 can be improved (the sheath 4 is less likely to break due to wear). As a result, the thickness of the sheath 4 can be reduced. The thickness of the sheath 4 is preferably 0.7 mm or less. Here, the thickness of the sheath 4 is set to 0.5 mm, and the outer shape of the sheath 4, that is, the outer diameter of the multi-core cable 1 is set to approximately 12.6 mm (the maximum outer diameter is 13.0 mm). As a result, the conductor cross-sectional area of the electric wires 3 can be increased and the conductor resistance of the electric wires 3 can be reduced while maintaining the cable outer diameter that can be inserted into the groove 11.

In the present embodiment, the sheath 4 is formed by non-solid extrusion molding (so-called tube extrusion molding). The sheath 4 is formed as a hollow cylinder with a hollow section 41 along the longitudinal direction. Within this hollow section 41, the heat detection line 2 and the electric wires 3 (i.e., the assembly 6) are placed. In the present embodiment, the sheath 4 functions to push the electric wires 3 radially inwardly and to press the electric wires 3 against the heat detection line 2. A contact area between the electric wire 3 and the sheath 4 is greater than a contact area between the electric wire 3 and the heat detection line 2.

In addition, by forming the sheath 4 by tube extrusion molding and reducing the thickness of the sheath 4 to 0.7 mm or less, the outer surface of the sheath 4 can be made uneven (e.g., with undulation) in such a manner that the sheath 4 includes convex portions corresponding to the electric wires 3. This makes it easier to press the multi-core cable 1 into the groove 11 of the housing 10 when inserting the multi-core cable 1 into the groove 11 of the housing 10.

Figure 5:
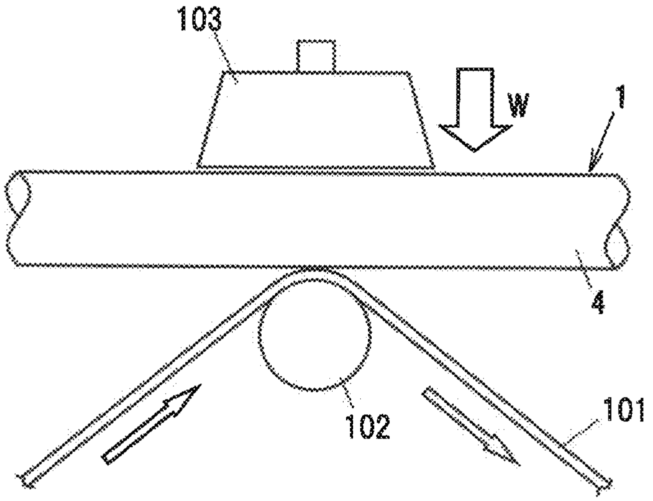
FIG. 5 is an explanatory diagram showing an abrasion resistance test.

As shown in FIG. 5, an abrasion resistance test of the sheath 4 was carried out using the multi-core cable 1 having the sheath 4 composed of PUV and having a thickness of 0.5 mm. In the abrasion resistance test, both ends of the multi-core cable 1 as a sample were fixed and held horizontally, a weight 103 with a load W of 300 g was placed at the center of the upper part of the multi-core cable 1, and a wear tape (i.e., abrasion tape) 101 (tape type: 150G) was arranged to abut the center of the lower part of the multi-core cable 1. A roller 102 for supporting the wear tape 101 was arranged at a position facing the weight 103 with respect to the multi-core cable 1, an angle between the wear tape 101 and the multi-core cable 1 (the sheath 4) was set to 30°, the moving speed of the wear tape 101 was set to 1500 mm/min, and the wear tape 101 was moved in one direction (from left to right in FIG. 5). Although not shown, conductive members each having a width of about 10 mm were provided at intervals of 150 mm along the longitudinal direction of the wear tape 101, the movement of the wear tape 101 continued until conduction occurs in the conductive member (that is, until the sheath 4 breaks), and the count was measured when the conduction occurred in the conductive member. As a result, in the multi-core cable 1 according to the present embodiment, the conduction occurred at 60 counts. For comparison, a similar test was carried out on a conventional example in which a sheath of 1.0 mm thickness was formed from a resin composition including a polyvinyl chloride resin as a base polymer, and conduction occurred at 35 counts. That is, in the present embodiment, 1.7 times the abrasion resistance was obtained with half the thickness of the conventional example.

(Comparison with the conventional example) Table 1 shows a comparison between the multi-core cable 1 in Example according to the present embodiment and a conventional multi-core cable including an assembly in which a string filler composed of polyethylene instead of the heat detection line 2 is arranged at the cable center, six (6) electric wires are arranged around the string filler, and a 1.0 mm-thick sheath composed of a resin composition including a polyvinyl chloride resin as a base polymer which is formed around the assembly.

TABLE 1

| | | Example | Conventional Example |
|---|---|---|---|
| Second conductor | Cross-sectional area | 7.2 $mm^2$ | 5.5 $mm^2$ |
| | Outer diameter | 3.47 mm | 3.07 mm |
| Sheath | Material | PUV | PVC |
| | Thickness | 0.5 mm | 1.0 mm |
| | Outer diameter | 12.6 mm | |
| AC resistance (about 10 kHz) | | 0.574 mΩ/m | 0.662 mΩ/m |

In the multi-core cable 1 of the embodiment, although the outer diameter is the same as that of the conventional example, the sheath 4 can be thinner than that of the conventional example. Accordingly, the conductor cross-sectional area of the second conductor 31 can be made larger than that of the conventional example, and the conductor resistance can be reduced. Furthermore, in the multi-core cable 1 of the embodiment, the jacket 24 has a three-layer structure and the roundness of the outer shape of the heat detection line 2 is increased, so that the electric current distribution of each electric wire 3 can be made uniform and the AC resistance can be reduced. In the examples shown in Table 1, the multi-core cable 1 of the Example can have an AC resistance of 0.574 mΩ/m at a high frequency of about 10 kHz, which is reduced by 13% as compared with the AC resistance of 0.662 mΩ/m of the conventional multi-core cable.

(Functions and effects of the embodiment) As described above, the multi-core cable 1 according to the present embodiment comprises the heat detection line 2, the plurality of electric wires 3 spirally twisted around the heat detection line 2, and the sheath 4 that collectively covers the plurality of electric wires 3, in which the jacket 24 of the heat detection line 2 has the inner layer 241, the outer layer 243, and the intermediate layer 242 provided between the inner layer 241 and the outer layer 243, in which the outer layer 243 is harder than the inner layer 241. Further, the intermediate layer 242 has a higher melting point than the outer layer 243 and the outer layer 243 is configured to be peelable from the intermediate layer 242.

By incorporating the heat detection line 2, it is possible to accurately detect the temperature rise in the multi-core cable 1 laid in the housing 10. In addition, by making the jacket 24 into a three-layer structure, the outer layer 243 can be formed by insertion extrusion or solid extrusion to increase the roundness of the outer layer 243. Furthermore, by making the outer layer 243 harder than the inner layer 241, the electric wires 3 can be arranged evenly. As a result, it is possible to make the current distribution of each electric wire 3 uniform and to reduce the AC resistance to the high-frequency AC. As a result, for example, it is possible to contribute to improving the efficiency of contactless power supply. It is also possible to peel off the outer layer 243 from the intermediate layer 242, thereby setting the outer diameter of the heat detection line 2 exposed at the cable end to a desired outer diameter.

(Summary of the embodiments) Next, the technical ideas grasped from the aforementioned embodiments will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

According to the feature [1], a multi-core cable 1, comprises: a heat detection line 2 comprising a twisted pair wire 22 comprising a pair of heat detecting wires 21 being twisted together, each heat detecting wire 21 comprising a first conductor 211 and a first insulator 212 covering around the first conductor 211, and a jacket 24 covering around the twisted pair wire 22; a plurality of electric wires 3 spirally twisted around the heat detection line 2, each electric wire 3 comprising a second conductor 31 and a second insulator 32 covering around the second conductor 31; and a sheath 4 covering the heat detection line 2 and the plurality of electric wires 3 together, wherein the jacket 24 comprises an inner layer 241, an outer layer 243, and an intermediate layer 242 provided between the inner layer 241 and the outer layer 243, and wherein a hardness of the outer layer 243 is higher than a hardness of the inner layer 241.

According to the feature [2], in the multi-core cable 1 as described in the feature [1], a melting point of the intermediate layer 242 is higher than a melting point of the outer layer 243, and the outer layer 243 is configured to be peelable from the intermediate layer 242.

According to the feature [3], in the multi-core cable 1 as described in the feature [1] or [2], each of the inner layer 241 and the outer layer 243 comprises a resin composition including a polyvinyl chloride resin as a main component, and the intermediate layer 242 comprises a resin composition including a fluororesin as a main component.

According to the feature [4], in the multi-core cable 1 as described in the feature [3], the fluororesin constituting the intermediate layer 242 comprises tetrafluoroethylene-ethylene copolymer.

According to the feature [5], in the multi-core cable 1 as described in any one of the features [1] to [4], the sheath comprises a resin composition comprising a polymer alloy including a polyvinyl chloride resin and urethane thermoplastic elastomer.

According to the feature [6], in the multi-core cable 1 as described in the feature [5], a thickness of the sheath 4 is 0.7 mm or less.

According to the feature [7], in the multi-core cable 1 as described in any one of the features [1] to [6], a hardness of the intermediate layer 242 is higher than the hardness of the outer layer 243.

Although the embodiments of the present invention have been described above, the aforementioned embodiments are not to be construed as limiting the inventions according to the appended claims. Further, it should be noted that not all the combinations of the features described in the embodiments are indispensable to the means for solving the problem of the invention.

Further, the present invention can appropriately be modified and implemented without departing from the spirit of the present invention. For example, in the above embodiment, the case where the multi-core cable 1 is the contactless power supply cable. However, the present invention is applicable to the applications other than the contactless power supply.

The invention claimed is:

1. A multi-core cable, comprising:

a heat detection line comprising a twisted pair wire comprising a pair of heat detecting wires being twisted together, each heat detecting wire comprising a first conductor and a first insulator covering around the first conductor, a jacket covering around the twisted pair wire, and a binder tape collectively covers around the twisted pair wire, and the jacket covers around the binder tape;

a plurality of electric wires spirally twisted around the heat detection line, each electric wire comprising a second conductor and a second insulator covering around the second conductor; and a sheath covering the heat detection line and the plurality of electric wires together, wherein the jacket comprises an inner layer, an outer layer, and an intermediate layer provided between the inner layer and the outer layer, and wherein a hardness of the outer layer is higher than a hardness of the inner layer.

2. The multi-core cable according to claim 1, wherein a melting point of the intermediate layer is higher than a melting point of the outer layer, and the outer layer is configured to be peelable from the intermediate layer.

3. The multi-core cable according to claim 1, wherein each of the inner layer and the outer layer comprises a resin composition including a polyvinyl chloride resin as a main component, and the intermediate layer comprises a resin composition including a fluororesin as a main component.

4. The multi-core cable according to claim 3, wherein the fluororesin constituting the intermediate layer comprises tetrafluoroethylene-ethylene copolymer.

5. The multi-core cable according to claim 4, wherein the sheath comprises a resin composition comprising a polymer alloy including a polyvinyl chloride resin and urethane thermoplastic elastomer.

6. The multi-core cable according to claim 5, wherein a thickness of the sheath is 0.7 mm or less.

7. The multi-core cable according to claim 1, wherein a hardness of the intermediate layer is higher than the hardness of the outer layer.

8. The multi-core cable according to claim 1, wherein the jacket surrounds the twisted pair wire collectively.

9. The multi-core cable according to claim 1, wherein the jacket covers collectively the twisted pair wire.

10. The multi-core cable according to claim 9, wherein the jacket comprises at least triple layers including the inner layer, the outer layer, and the intermediate layer throughout the jacket to completely cover the twisted pair wire.

11. A multi-core cable, comprising:

a heat detection line comprising a twisted pair wire comprising a pair of heat detecting wires being twisted together, each heat detecting wire comprising a first conductor and a first insulator covering around the first conductor, a jacket surrounding around the twisted pair wire, and a binder tape collectively covers around the twisted pair wire, and the jacket covers around the binder tape;

a plurality of electric wires spirally twisted around the heat detection line, each electric wire comprising a second conductor and a second insulator covering around the second conductor; and a sheath covering the heat detection line and the plurality of electric wires together, wherein the jacket comprises at least triple layers, and wherein a hardness of the outer layer is higher than a hardness of the inner layer.

12. The multi-core cable according to claim 11, wherein a melting point of the intermediate layer is higher than a melting point of the outer layer, and the outer layer is configured to be peelable from the intermediate layer.

13. The multi-core cable according to claim 11, wherein each of the inner layer and the outer layer comprises a resin composition including a polyvinyl chloride resin as a main component, and the intermediate layer comprises a resin composition including a fluororesin as a main component.

14. The multi-core cable according to claim 13, wherein the fluororesin constituting the intermediate layer comprises tetrafluoroethylene-ethylene copolymer.

15. The multi-core cable according to claim 14, wherein the sheath comprises a resin composition comprising a polymer alloy including a polyvinyl chloride resin and urethane thermoplastic elastomer.

16. The multi-core cable according to claim 15, wherein a thickness of the sheath is 0.7 mm or less.

17. The multi-core cable according to claim 11, wherein a hardness of the intermediate layer is higher than the hardness of the outer layer.

18. The multi-core cable according to claim 11, wherein the jacket surrounds the twisted pair wire collectively.

19. The multi-core cable according to claim 11, wherein the jacket covers collectively the twisted pair wire.

20. The multi-core cable according to claim 19, wherein the jacket comprises at least triple layers including an inner layer, an outer layer, and an intermediate layer throughout the jacket to completely cover the twisted pair wire.

* * * * *